(12) United States Patent
Kim

(10) Patent No.: US 11,447,182 B2
(45) Date of Patent: Sep. 20, 2022

(54) TRUCK FRAME

(71) Applicants: Hyundai Motor Company, Seoul (KR); Kia Motors Corporation, Seoul (KR)

(72) Inventor: Jong Min Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 441 days.

(21) Appl. No.: 16/600,867

(22) Filed: Oct. 14, 2019

(65) Prior Publication Data
US 2020/0231212 A1  Jul. 23, 2020

(30) Foreign Application Priority Data

Jan. 17, 2019 (KR) .................. 10-2019-0006169

(51) Int. Cl.
| | | |
|---|---|---|
| *B62D 21/08* | (2006.01) | |
| *B60K 1/04* | (2019.01) | |
| *B62D 21/06* | (2006.01) | |
| *B62D 21/02* | (2006.01) | |

(52) U.S. Cl.
CPC .............. *B62D 21/08* (2013.01); *B60K 1/04* (2013.01); *B62D 21/02* (2013.01); *B62D 21/06* (2013.01); *B60K 2001/0438* (2013.01)

(58) Field of Classification Search
CPC .......... B60K 1/04; B62D 21/02; B62D 21/06; B62D 21/08
USPC ..................................... 296/30, 203.01, 204
See application file for complete search history.

(56) References Cited

U.S. PATENT DOCUMENTS

| 10,988,014 B2 * | 4/2021 | Baccouche | ............ B62D 21/15 |
| 2009/0033127 A1 * | 2/2009 | Duerr | .................... B62D 21/02 296/203.01 |
| 2019/0351750 A1 * | 11/2019 | Caliskan | ............... B62D 21/02 |

FOREIGN PATENT DOCUMENTS

| CN | 106428211 A | * | 2/2017 | ............. B62D 21/02 |
| CN | 106926903 A | * | 7/2017 | |
| DE | 102018122854 A1 | * | 3/2020 | ............... B60K 1/04 |

OTHER PUBLICATIONS

English translation of CN 106926903; retrieved via PatentTranslate located www.epo.org. (Year: 2017).*
English translation of de 10 2018 122 854; retrieved via PatentTranslate located www.epo.org. (Year: 2018).*

* cited by examiner

*Primary Examiner* — Jason S Daniels
(74) *Attorney, Agent, or Firm* — Fox Rothschild LLP

(57) ABSTRACT

A truck frame includes: a first side rail including a first web, a first top flange formed on a top end of the first web, and a first bottom flange formed on a bottom end of the first web; a second side rail spaced apart from the first side rail to face the first side rail, and including a second web, a second top flange formed on a top end of the second web, and a second bottom flange formed on a bottom end of the second web; a reinforcing structure connecting the first top flange of the first side rail and the second top flange of the second side rail, and connecting the first bottom flange of the first side rail and the second bottom flange of the second side rail; and a component mounting space defined by the reinforcing structure between the first web of the first side rail and the second web of the second side rail.

11 Claims, 6 Drawing Sheets

TRUCK FRAME

CROSS-REFERENCE TO RELATED APPLICATION

This application claims under 35 U.S.C. § 119(a) the benefit of Korean Patent Application No. 10-2019-0006169, filed on Jan. 17, 2019 in the Korean Intellectual Property Office, the entire contents of which are incorporated by reference herein.

BACKGROUND

(a) Technical Field

The present disclosure relates to a truck frame, more particularly, to the truck frame capable of improving stiffness of a vehicle body, and securing a space for mounting a battery or various components between a pair of side rails.

(b) Description of the Related Art

A truck is a vehicle designed for transporting loads or goods. A truck frame typically has a pair of side rails extending in a longitudinal direction of the truck, and being spaced apart from each other in a width direction of the truck. Each side rail is made up of a web having a predetermined height, and a C-shaped beam having a pair of flanges formed on top and bottom ends of the web. In addition, the truck frame has a plurality of crossmembers connecting the side rails, and being spaced apart at regular intervals in a longitudinal direction of the side rail. Each crossmember has a length corresponding to spacing between the side rails and a height corresponding to that of the web of each side rail so that each crossmember may be configured to fill an empty space between the webs of the side rails.

Trucks with internal combustion engines may contribute to global warming due to exhaust emissions. In particular, trucks with diesel engines produce fine dust. To alleviate these problems, electric trucks using batteries and electric motors are being developed. In electric trucks, electronic systems for the operation of electric motors and other electric devices have been recently developed, but the body of an electric truck still utilizes an existing truck frame for a diesel engine truck.

Unlike the diesel engine truck, the electric truck does not have a propeller shaft that is transverse to the engine and the front and rear of the vehicle, but requires a relatively large space for mounting batteries for driving the electric motor, etc. In particular, an important marketable factor of the electric truck is a distance (range) travelled by the batteries. For example, when two batteries are mounted, the range may be 380 km. However, when one more battery is mounted, the range may be increased by about 50% from the previous one, which may greatly improve marketability.

However, the existing truck frame does not provide enough space for mounting the batteries as the plurality of crossmembers fill the empty space between the webs of the side rails. That is, the existing truck frame has failed to properly utilize the empty space between the side rails.

Meanwhile, if some crossmembers are removed from sections of the existing truck frame between the side rails in order to utilize the empty space between the side rails, the body stiffness of the electric truck may be reduced.

The above information described in this background section is provided to assist in understanding the background of the inventive concept, and may include any technical concept which is not considered as the prior art that is already known to those skilled in the art.

SUMMARY

An aspect of the present disclosure provides a truck frame capable of securing a space for mounting a battery or various components between a pair of side rails, and improving the stiffness of a vehicle body, thereby being commonly applicable to a variety of trucks such as diesel engine trucks and electric trucks.

According to an aspect of the present disclosure, a truck frame may include: a first side rail including a first web, a first top flange formed on a top end of the first web, and a first bottom flange formed on a bottom end of the first web; a second side rail spaced apart from the first side rail to face the first side rail, and including a second web, a second top flange formed on a top end of the second web, and a second bottom flange formed on a bottom end of the second web; a reinforcing structure connecting the first top flange of the first side rail and the second top flange of the second side rail, and connecting the first bottom flange of the first side rail and the second bottom flange of the second side rail; and a component mounting space defined by the reinforcing structure between the first web of the first side rail and the second web of the second side rail.

The reinforcing structure may include: a first reinforcing member extending diagonally between the first top flange of the first side rail and the second top flange of the second side rail; a second reinforcing member extending diagonally between the first top flange of the first side rail and the second top flange of the second side rail; a third reinforcing member extending diagonally between the first bottom flange of the first side rail and the second bottom flange of the second side rail; and a fourth reinforcing member extending diagonally between the first bottom flange of the first side rail and the second bottom flange of the second side rail.

The first reinforcing member and the second reinforcing member may be connected to cross each other, and the third reinforcing member and the fourth reinforcing member may be connected to cross each other.

The first reinforcing member may have a first pair of coupling flanges individually coupled to the first top flange of the first side rail and the second top flange of the second side rail, and an overlapping portion located between the first pair of coupling flanges, and the second reinforcing member may have a second pair of coupling flanges individually coupled to the first top flange of the first side rail and the second top flange of the second side rail, and an overlapping portion located between the second pair of coupling flanges.

The overlapping portion of the first reinforcing member and the overlapping portion of the second reinforcing member may overlap and be coupled to each other.

The third reinforcing member may have a third pair of coupling flanges individually coupled to the first bottom flange of the first side rail and the second bottom flange of the second side rail, and an overlapping portion located between the third pair of coupling flanges, and the fourth reinforcing member may have a fourth pair of coupling flanges individually coupled to the first bottom flange of the first side rail and the second bottom flange of the second side rail, and an overlapping portion located between the fourth pair of coupling flanges.

The overlapping portion of the third reinforcing member and the overlapping portion of the fourth reinforcing member may overlap and be coupled to each other.

The component mounting space may be defined by the first reinforcing member, the second reinforcing member, the third reinforcing member, the fourth reinforcing member, the first web of the first side rail, and the second web of the second side rail.

A battery may be mounted in the component mounting space.

According to another aspect of the present disclosure, a truck frame may include: a first side rail including a first web, a first top flange formed on a top end of the first web, and a first bottom flange formed on a bottom end of the first web; a second side rail spaced apart from the first side rail to face the first side rail, and including a second web, a second top flange formed on a top end of the second web, and a second bottom flange formed on a bottom end of the second web; a front reinforcing structure adjacent to front wheels of a truck, connecting the first top flange of the first side rail and the second top flange of the second side rail, and connecting the first bottom flange of the first side rail and the second bottom flange of the second side rail; a rear reinforcing structure adjacent to rear wheels of the truck, connecting the first top flange of the first side rail and the second top flange of the second side rail, and connecting the first bottom flange of the first side rail and the second bottom flange of the second side rail; a front-side component mounting space defined by the front reinforcing structure between the first web of the first side rail and the second web of the second side rail; and a rear-side component mounting space defined by the rear reinforcing structure between the first web of the first side rail and the second web of the second side rail.

At least two components may be mounted on the first side rail and the second side rail to be disposed on both sides of the front reinforcing structure.

At least two components may be mounted on the first side rail and the second side rail to be disposed on both sides of the rear reinforcing structure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
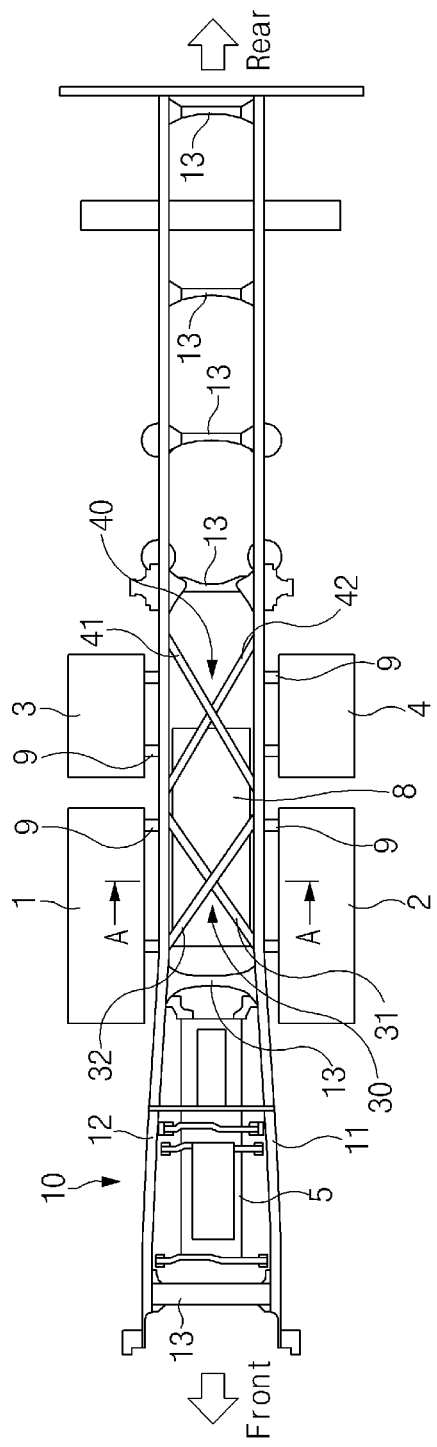
FIG. 1 illustrates a plan view of a truck frame according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a truck frame 10 according to an exemplary embodiment of the present disclosure may include a first side rail 11 and a second side rail 12 spaced apart from each other in a width direction of a vehicle body. The first side rail 11 and the second side rail 12 may be disposed to face each other.

The first side rail 11 may extend in a longitudinal direction of the vehicle body, and the first side rail 11 may be a beam having a C-shaped or I-shaped cross section. For example, the first side rail 11 may have a thickness of approximately 8 mm.

Figure 2:
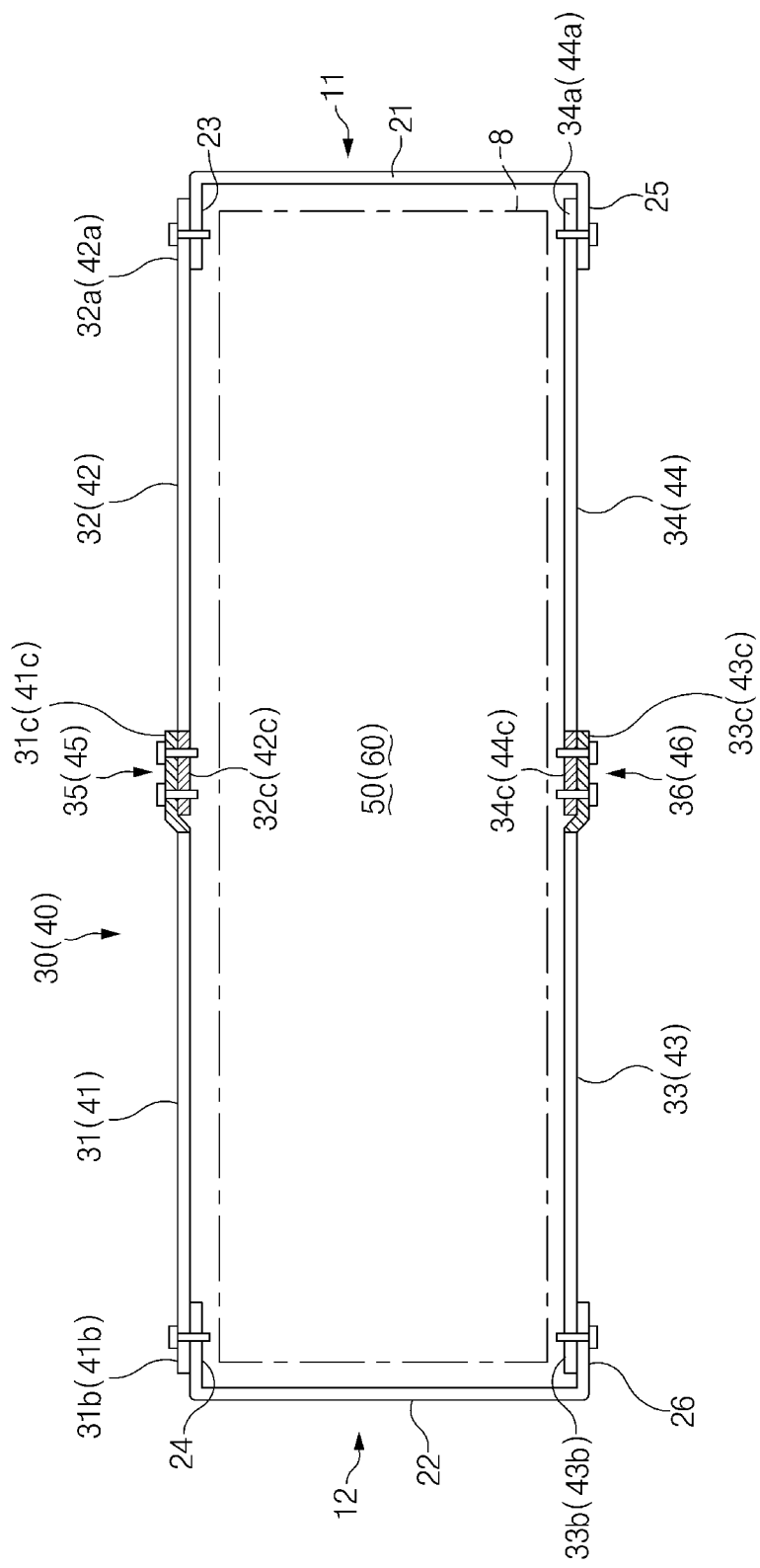
FIG. 2 illustrates a cross-sectional view taken along line A-A of FIG. 1.

According to an exemplary embodiment, the first side rail 11 may include, as illustrated in FIG. 2, a first web 21 extending vertically (in a height direction of the truck frame 10), a first top flange 23 formed on a top end of the first web 21, and a first bottom flange 25 formed on a bottom end of the first web 21.

The second side rail 12 may extend in the longitudinal direction of the vehicle body, and the second side rail 12 may be a beam having a C-shaped or I-shaped cross section. For example, the second side rail 12 may have a thickness of approximately 8 mm.

According to an exemplary embodiment, the second side rail 12 may include, as illustrated in FIG. 2, a second web 22 extending vertically (in the height direction of the truck frame 10), a second top flange 24 formed on a top end of the second web 22, and a second bottom flange 26 formed on a bottom end of the second web 22.

The truck frame 10 according to an exemplary embodiment of the present disclosure may include a plurality of crossmembers 13 connecting the first side rail 11 and the second side rail 12.

The plurality of crossmembers 13 may be spaced apart from each other in a longitudinal direction of the first side rail 11 and the second side rail 12. Each crossmember 13 may have a height corresponding to that of the first web 21 of the first side rail 11 and that of the second web 22 of the second side rail 12. Each crossmember 13 may have a length corresponding to the spacing between the first web 21 of the first side rail 11 and the second web 22 of the second side rail 12. Since the crossmembers 13 fill a space between the first web 21 of the first side rail 11 and the second web 22 of the second side rail 12, a battery or heavy components may not be mounted in portions between the first side rail 11 and the second side rail 12 in which the crossmembers 13 are mounted.

Referring to FIG. 1, a plurality of components 1, 2, 3, and 4 may be mounted on the outside of the first side rail 11 and the outside of the second side rail 12 by brackets 9. For example, the plurality of components 1, 2, 3, and 4 may include a battery 1, a controller 2, a cooling module 3 cooling the battery 1, and a chiller 4. The battery 1 and the cooling module 3 may be mounted on the outside of the second side rail 12, and the controller 2 and the chiller 4 may be mounted on the outside of the first side rail 11, for example.

An electronic system 5 for operating an electric motor and other electric devices with power from the battery 1 may be located at the front of the truck frame 10. In particular, the electronic system 5 may be disposed between the first side rail 11 and the second side rail 12.

Figure 4:
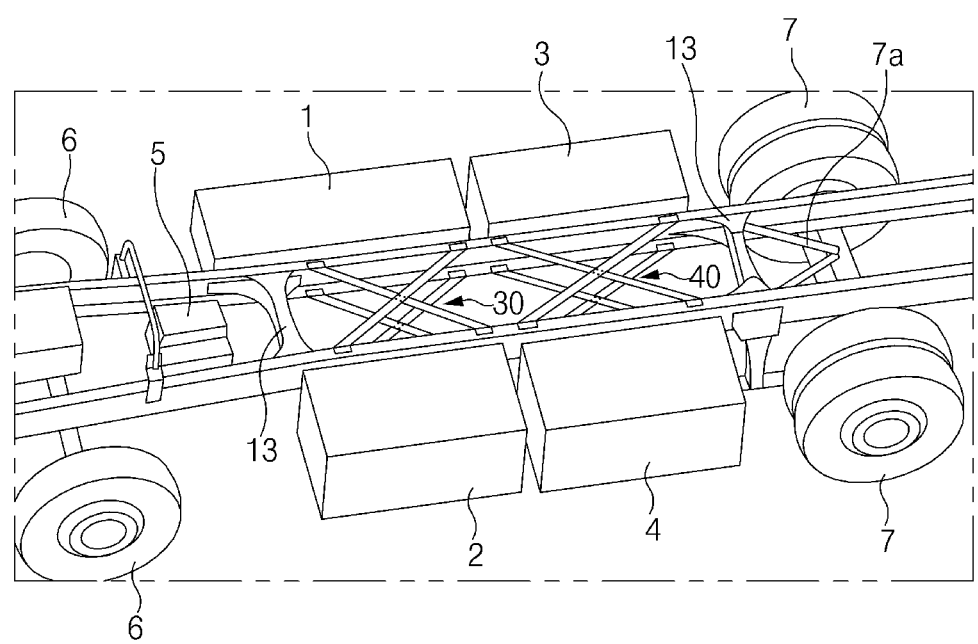
FIG. 4 illustrates a perspective view of a truck frame according to an exemplary embodiment of the present disclosure.

Referring to FIG. 4, a pair of front wheels 6 may be mounted at the front of the truck frame 10, and relatively heavy components such as the battery 1 and the controller 2 may be adjacent to the front wheels 6. A pair of rear wheels 7 may be mounted at the rear of the truck frame 10, and relatively light components such as the cooling module 3 and the chiller 4 may be adjacent to the rear wheels 7.

Figure 3:
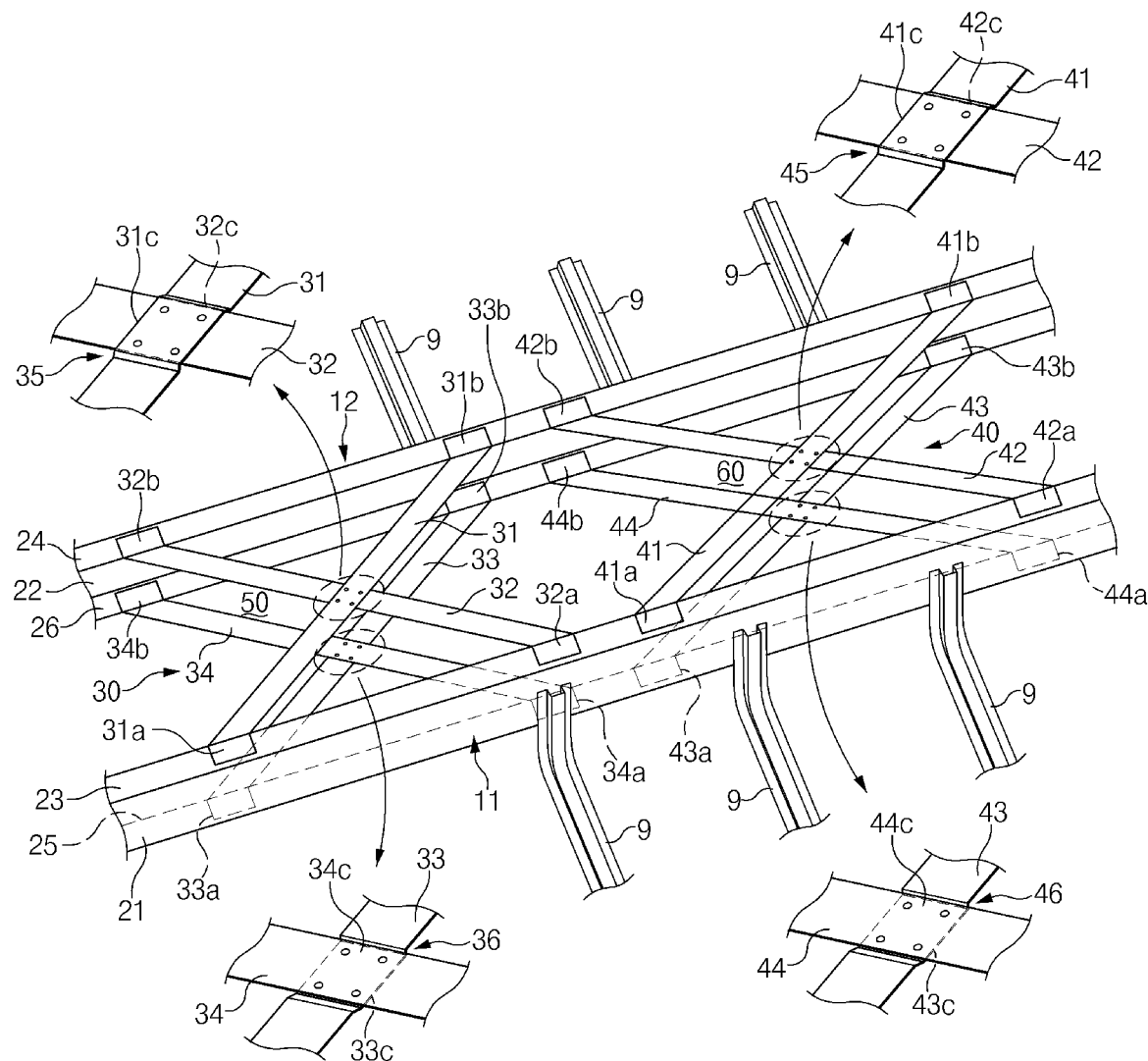
FIG. 3 illustrates a perspective view of a front reinforcing structure and a rear reinforcing structure in a truck frame according to an exemplary embodiment of the present disclosure.

Referring to FIGS. 1 to 3, the truck frame 10 may include one or more component mounting spaces 50 and 60 defined between the first side rail 11 and the second side rail 12. The component mounting spaces 50 and 60 may be utilized as a space for mounting an additional battery 8 or other heavy components.

The component mounting spaces 50 and 60 may be provided between the first side rail 11 and the second side rail 12 by one or more reinforcing structures 30 and 40 having a plurality of reinforcing members 31, 32, 33, 34, 41, 42, 43, and 44. In particular, the component mounting spaces 50 and 60 may be located between the front wheels 6 and the rear wheels 7. Each of the reinforcing members 31, 32, 33, 34, 41, 42, 43 and 44 may be a metal strip, and a thickness thereof may be approximately 6 mm.

The reinforcing structures 30 and 40 may include first reinforcing members 31 and 41 and second reinforcing members 32 and 42 crossing in an X shape so as to connect the first top flange 23 of the first side rail 11 and the second top flange 24 of the second side rail 12, and third reinforcing members 33 and 43 and fourth reinforcing members 34 and 44 crossing in an X shape so as to connect the first bottom flange 25 of the first side rail 11 and the second bottom flange 26 of the second side rail 12. Thus, the component mounting spaces 50 and 60 may be defined by the first reinforcing members 31 and 41, the second reinforcing members 32 and 42, the third reinforcing members 33 and 43, the fourth reinforcing members 34 and 44, the first web 21 of the first side rail 11, and the second web 22 of the second side rail 12.

Figure 5:
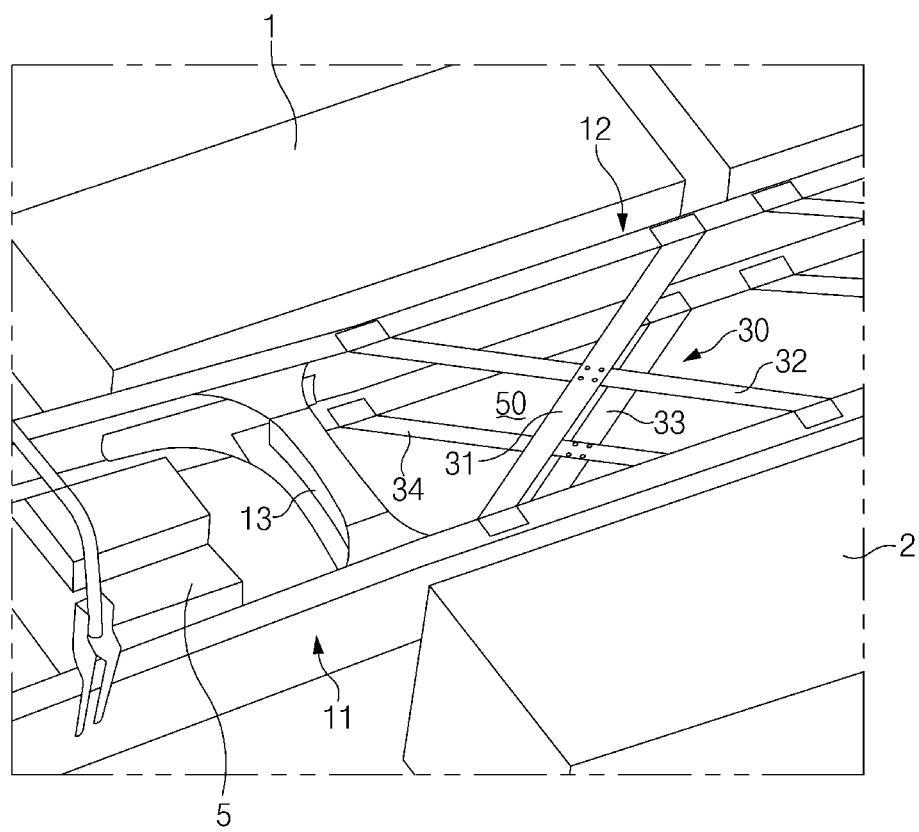
FIG. 5 illustrates an enlarged view of a front reinforcing structure of FIG. 4.
Figure 6:
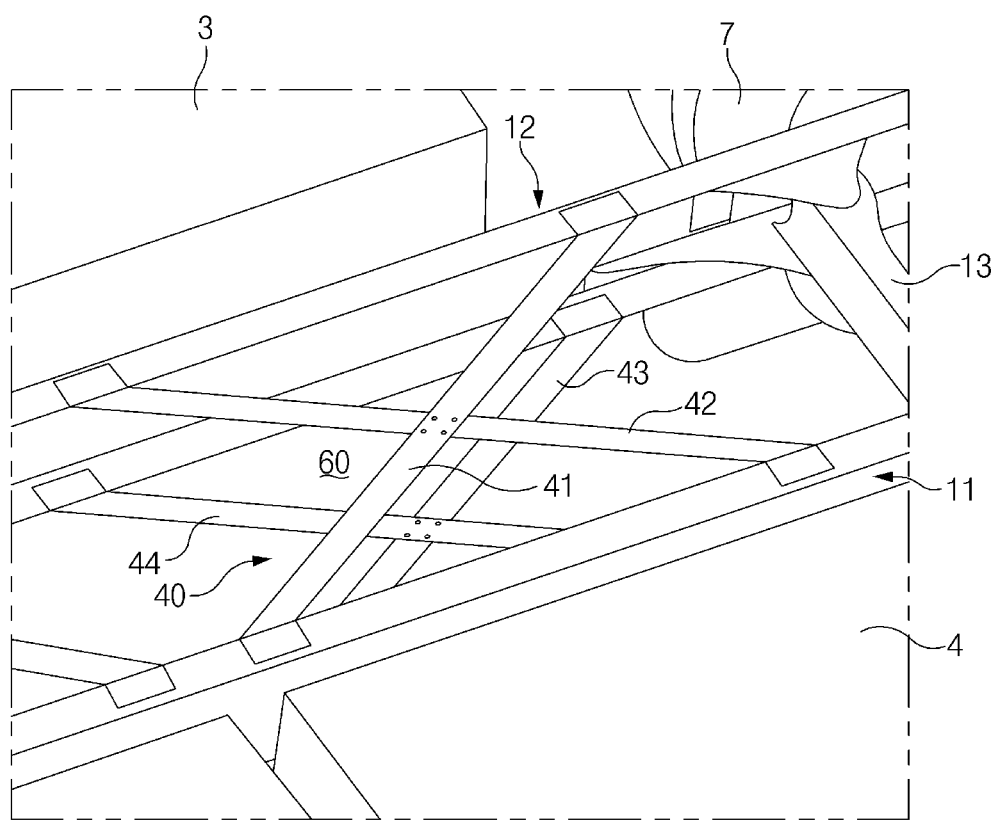
FIG. 6 illustrates an enlarged view of a rear reinforcing structure of FIG. 4.

According to an exemplary embodiment, as illustrated in FIGS. 4 to 6, the component mounting spaces 50 and 60 may include a front-side component mounting space 50 adjacent to the front wheels 6 and a rear-side component mounting space 60 adjacent to the rear wheels 7.

The front-side component mounting space 50 may be defined between the first web 21 of the first side rail 11 and the second web 22 of the second side rail 12 by the front reinforcing structure 30.

The front reinforcing structure 30 may connect the first top flange 23 of the first side rail 11 and the second top flange 24 of the second side rail 12, and connect the first bottom flange 25 of the first side rail 11 and the second bottom flange 26 of the second side rail 12, thereby defining the front-side component mounting space 50 between the first web 21 of the first side rail 11 and the second web 22 of the second side rail 12. The front reinforcing structure 30 may include a first front reinforcing member 31 and a second front reinforcing member 32 connecting between the first top flange 23 of the first side rail 11 and the second top flange 24 of the second side rail 12, and a third front reinforcing member 33 and a fourth front reinforcing member 34 connecting between the first bottom flange 25 of the first side rail 11 and the second bottom flange 26 of the second side rail 12.

The first front reinforcing member 31 may extend diagonally between the first top flange 23 of the first side rail 11 and the second top flange 24 of the second side rail 12. The first front reinforcing member 31 may have a front coupling flange 31a coupled to the first top flange 23 of the first side rail 11 by using fasteners, welding, and/or the like, a rear coupling flange 31b individually coupled to the second top flange 24 of the second side rail 12 by using fasteners, welding, and/or the like, and an overlapping portion 31c located between the front coupling flange 31a and the rear coupling flange 31b. The front coupling flange 31a may be located ahead of the rear coupling flange 31b.

The second front reinforcing member 32 may extend diagonally between the first top flange 23 of the first side rail 11 and the second top flange 24 of the second side rail 12. The second front reinforcing member 32 may have a rear coupling flange 32a coupled to the first top flange 23 of the first side rail 11 by using fasteners, welding, and/or the like, a front coupling flange 32b individually coupled to the second top flange 24 of the second side rail 12 by using fasteners, welding, and/or the like, and an overlapping portion 32c located between the rear coupling flange 32a and the front coupling flange 32b. The rear coupling flange 32a may be located behind the front coupling flange 32b.

The front coupling flange 31a of the first front reinforcing member 31 may face the front coupling flange 32b of the second front reinforcing member 32, and the rear coupling flange 31b of the first front reinforcing member 31 may face the rear coupling flange 32a of the second front reinforcing member 32. The overlapping portion 31c of the first front reinforcing member 31 may overlap the overlapping portion 32c of the second front reinforcing member 32, and the overlapping portion 31c of the first front reinforcing member 31 and the overlapping portion 32c of the second front reinforcing member 32 may be coupled by using fasteners, welding, and/or the like to form a top joint 35. In this manner, the first front reinforcing member 31 and the second front reinforcing member 32 may be joined together to cross in an X shape.

For example, the coupling flanges 31a and 31b of the first front reinforcing member 31 and the coupling flanges 32a and 32b of the second front reinforcing member 32 may be coupled to the top flanges 23 and 24 of the side rails 11 and 12 by two bolts, and the overlapping portion 31c of the first front reinforcing member 31 and the overlapping portion 32c of the second front reinforcing member 32 may be coupled by four bolts.

The overlapping portion of one of the first front reinforcing member 31 and the second front reinforcing member 32 may be recessed with respect to the overlapping portion of the other front reinforcing member in the height direction of the truck frame 10, so that the overlapping portion 31c of the first front reinforcing member 31 and the overlapping portion 32c of the second front reinforcing member 32 may be firmly joined. For example, as illustrated in FIG. 3, the overlapping portion 31c of the first front reinforcing member 31 may be recessed with respect to the overlapping portion 32c of the second front reinforcing member 32 in the height direction of the truck frame 10 so that the overlapping portion 32c of the second front reinforcing member 32 may be inserted into the overlapping portion 31c of the first front reinforcing member 31. In this manner, the first front reinforcing member 31 and the second front reinforcing member 32 may be mounted flat (horizontally) with respect to the first top flange 23 of the first side rail 11 and the second top flange 24 of the second side rail 12.

The third front reinforcing member 33 may extend diagonally between the first bottom flange 25 of the first side rail 11 and the second bottom flange 26 of the second side rail 12. The third front reinforcing member 33 may have a front coupling flange 33a coupled to the first bottom flange 25 of the first side rail 11 by using fasteners, welding, and/or the like, a rear coupling flange 33b individually coupled to the second bottom flange 26 of the second side rail 12 by using fasteners, welding, and/or the like, and an overlapping portion 33c located between the front coupling flange 33a and the rear coupling flange 33b. The front coupling flange 33a may be located ahead of the rear coupling flange 33b.

The fourth front reinforcing member 34 may extend diagonally between the first bottom flange 25 of the first side rail 11 and the second bottom flange 26 of the second side rail 12. The fourth front reinforcing member 34 may have a rear coupling flange 34a coupled to the first bottom flange 25 of the first side rail 11 by using fasteners, welding, and/or the like, a front coupling flange 34b individually coupled to the second bottom flange 26 of the second side rail 12 by using fasteners, welding, and/or the like, and an overlapping portion 34c located between the rear coupling flange 34a and the front coupling flange 34b. The rear coupling flange 34a may be located behind the front coupling flange 34b.

The front coupling flange 33a of the third front reinforcing member 33 may face the front coupling flange 34b of the fourth front reinforcing member 34, and the rear coupling flange 33b of the third front reinforcing member 33 may face the rear coupling flange 34a of the fourth front reinforcing member 34. The overlapping portion 33c of the third front reinforcing member 33 may overlap the overlapping portion 34c of the fourth front reinforcing member 34, and the overlapping portion 33c of the third front reinforcing member 33 and the overlapping portion 34c of the fourth front reinforcing member 34 may be coupled by using fasteners, welding, and/or the like to form a bottom joint 36. In this manner, the third front reinforcing member 33 and the fourth front reinforcing member 34 may be joined together to cross in an X shape.

For example, the coupling flanges 33a and 33b of the third front reinforcing member 33 and the coupling flanges 34a and 34b of the fourth front reinforcing member 34 may be coupled to the bottom flanges 25 and 26 of the side rails 11 and 12 by two bolts, and the overlapping portion 33c of the third front reinforcing member 33 and the overlapping portion 34c of the fourth front reinforcing member 34 may be coupled by four bolts.

The overlapping portion of one of the third front reinforcing member 33 and the fourth front reinforcing member 34 may be recessed with respect to the overlapping portion of the other front reinforcing member in the height direction of the truck frame 10, so that the overlapping portion 33c of the third front reinforcing member 33 and the overlapping portion 34c of the fourth front reinforcing member 34 may be firmly joined. For example, as illustrated in FIG. 3, the overlapping portion 33c of the third front reinforcing member 33 may be recessed with respect to the overlapping portion 34c of the fourth front reinforcing member 34 in the height direction of the truck frame 10 so that the overlapping portion 34c of the fourth front reinforcing member 34 may be inserted into the overlapping portion 33c of the third front reinforcing member 33. In this manner, the third front reinforcing member 33 and the fourth front reinforcing member 34 may be mounted flat (horizontally) with respect to the first bottom flange 25 of the first side rail 11 and the second bottom flange 26 of the second side rail 12.

Referring to FIGS. 1, 4, and 5, the front reinforcing structure 30 may be disposed adjacent to the front wheels 6. In particular, the front reinforcing structure 30 may be disposed between the battery 1 and the controller 2 corresponding to the heaviest components. The first side rail 11 and the second side rail 12 of the truck frame 10 may be structurally vulnerable to a torsional load due to the battery 1 and the controller 2 mounted on the outside of the rails, but the front reinforcing structure 30 may be mounted between the battery 1 and the controller 2 so that the first side rail 11 and the second side rail 12 of the truck frame 10 may effectively resist the torsional load. That is, the truck frame 10 according to exemplary embodiments of the present disclosure may improve the stiffness of the vehicle body by the front reinforcing structure 30, and provide the front-side component mounting space 50, in which the additional battery 8 or other heavy components are mounted, between the first side rail 11 and the second side rail 12.

The rear reinforcing structure 40 may include a first rear reinforcing member 41 and a second rear reinforcing member 42 connecting between the first top flange 23 of the first side rail 11 and the second top flange 24 of the second side rail 12, and a third rear reinforcing member 43 and a fourth rear reinforcing member 44 connecting between the first bottom flange 25 of the first side rail 11 and the second bottom flange 26 of the second side rail 12.

The first rear reinforcing member 41 may extend diagonally between the first top flange 23 of the first side rail 11 and the second top flange 24 of the second side rail 12. The first rear reinforcing member 41 may have a front coupling flange 41a coupled to the first top flange 23 of the first side rail 11 by using fasteners, welding, and/or the like, a rear coupling flange 41b individually coupled to the second top flange 24 of the second side rail 12 by using fasteners, welding, and/or the like, and an overlapping portion 41c located between the front coupling flange 41a and the rear coupling flange 41b. The front coupling flange 41a may be located ahead of the rear coupling flange 41b.

The second rear reinforcing member 42 may extend diagonally between the first top flange 23 of the first side rail 11 and the second top flange 24 of the second side rail 12. The second rear reinforcing member 42 may have a rear coupling flange 42a coupled to the first top flange 23 of the first side rail 11 by using fasteners, welding, and/or the like, a front coupling flange 42b individually coupled to the second top flange 24 of the second side rail 12 by using fasteners, welding, and/or the like, and an overlapping portion 42c located between the rear coupling flange 42a and the front coupling flange 42b. The rear coupling flange 42a may be located behind the front coupling flange 42b.

The front coupling flange 41a of the first rear reinforcing member 41 may face the front coupling flange 42b of the second rear reinforcing member 42, and the rear coupling flange 41b of the first rear reinforcing member 41 may face the rear coupling flange 42a of the second rear reinforcing member 42. The overlapping portion 41c of the first rear reinforcing member 41 may overlap the overlapping portion 42c of the second rear reinforcing member 42, and the overlapping portion 41c of the first rear reinforcing member 41 and the overlapping portion 42c of the second rear reinforcing member 42 may be coupled by using fasteners, welding, and/or the like to form a top joint 45. In this manner, the first rear reinforcing member 41 and the second rear reinforcing member 42 may be joined together to cross in an X shape.

For example, the coupling flanges 41a and 41b of the first rear reinforcing member 41 and the coupling flanges 42a and 42b of the second rear reinforcing member 42 may be coupled to the top flanges 23 and 24 of the side rails 11 and 12 by two bolts, and the overlapping portion 41c of the first rear reinforcing member 41 and the overlapping portion 42c of the second rear reinforcing member 42 may be coupled by four bolts.

The overlapping portion of one of the first rear reinforcing member 41 and the second rear reinforcing member 42 may be recessed with respect to the overlapping portion of the other rear reinforcing member in the height direction of the truck frame 10, so that the overlapping portion 41c of the first rear reinforcing member 41 and the overlapping portion 42c of the second rear reinforcing member 42 may be firmly joined. For example, as illustrated in FIG. 3, the overlapping portion 41c of the first rear reinforcing member 41 may be recessed with respect to the overlapping portion 42c of the second rear reinforcing member 42 in the height direction of the truck frame 10 so that the overlapping portion 42c of the second rear reinforcing member 42 may be inserted into the overlapping portion 41c of the first rear reinforcing member 41. In this manner, the first rear reinforcing member 41 and the second rear reinforcing member 42 may be mounted flat (horizontally) with respect to the first top flange 23 of the first side rail 11 and the second top flange 24 of the second side rail 12.

The third rear reinforcing member 43 may extend diagonally between the first bottom flange 25 of the first side rail 11 and the second bottom flange 26 of the second side rail 12. The third rear reinforcing member 43 may have a front coupling flange 43a coupled to the first bottom flange 25 of the first side rail 11 by using fasteners, welding, and/or the like, a rear coupling flange 43b individually coupled to the second bottom flange 26 of the second side rail 12 by using fasteners, welding, and/or the like, and an overlapping portion 43c located between the front coupling flange 43a and the rear coupling flange 43b. The front coupling flange 43a may be located ahead of the rear coupling flange 43b.

The fourth rear reinforcing member 44 may extend diagonally between the first bottom flange 25 of the first side rail 11 and the second bottom flange 26 of the second side rail 12. The fourth rear reinforcing member 44 may have a rear coupling flange 44a coupled to the first bottom flange 25 of the first side rail 11 by using fasteners, welding, and/or the like, a front coupling flange 44b individually coupled to the second bottom flange 26 of the second side rail 12 by using fasteners, welding, and/or the like, and an overlapping portion 44c located between the rear coupling flange 44a and the front coupling flange 44b. The rear coupling flange 44a may be located behind the front coupling flange 44b.

The front coupling flange 43a of the third rear reinforcing member 43 may face the front coupling flange 44b of the fourth rear reinforcing member 44, and the rear coupling flange 43b of the third rear reinforcing member 43 may face the rear coupling flange 44a of the fourth rear reinforcing member 44. The overlapping portion 43c of the third rear reinforcing member 43 may overlap the overlapping portion 44c of the fourth rear reinforcing member 44, and the overlapping portion 43c of the third rear reinforcing member 43 and the overlapping portion 44c of the fourth rear reinforcing member 44 may be coupled by using fasteners, welding, and/or the like to form a bottom joint 46. In this manner, the third rear reinforcing member 43 and the fourth rear reinforcing member 44 may be joined together to cross in an X shape.

For example, the coupling flanges 43a and 43b of the third rear reinforcing member 43 and the coupling flanges 44a and 44b of the fourth rear reinforcing member 44 may be coupled to the bottom flanges 25 and 26 of the side rails 11 and 12 by two bolts, and the overlapping portion 43c of the third rear reinforcing member 43 and the overlapping portion 44c of the fourth rear reinforcing member 44 may be coupled by four bolts.

The overlapping portion of one of the third rear reinforcing member 43 and the fourth rear reinforcing member 44 may be recessed with respect to the overlapping portion of the other rear reinforcing member in the height direction of the truck frame 10, so that the overlapping portion 43c of the third rear reinforcing member 43 and the overlapping portion 44c of the fourth rear reinforcing member 44 may be firmly joined. For example, as illustrated in FIG. 3, the overlapping portion 43c of the third rear reinforcing member 43 may be recessed with respect to the overlapping portion 44c of the fourth rear reinforcing member 44 in the height direction of the truck frame 10 so that the overlapping portion 44c of the fourth rear reinforcing member 44 may be inserted into the overlapping portion 43c of the third rear reinforcing member 43. In this manner, the third rear reinforcing member 43 and the fourth rear reinforcing member 44 may be mounted flat (horizontally) with respect to the first bottom flange 25 of the first side rail 11 and the second bottom flange 26 of the second side rail 12.

Referring to FIGS. 1, 4, and 6, the rear reinforcing structure 40 may be disposed adjacent to the rear wheels 7, in particular, a rear wheel suspension 7a. The rear reinforcing structure 40 may uniformly distribute a load transmitted through the rear wheel suspension 7a to the first side rail 11 and the second side rail 12 through the plurality of rear reinforcing members 41, 42, 43, and 44 crossing in the "X" shape, so that the stiffness of the vehicle body may be improved. In addition, the rear reinforcing structure 40 may be disposed between the cooling module 3 and the chiller 4, and the first side rail 11 and the second side rail 12 of the truck frame 10 may be structurally vulnerable to a torsional load due to the cooling module 3 and the chiller 4 mounted on the outside of the rails, but the rear reinforcing structure 40 may be mounted between the cooling module 3 and the chiller 4 so that the first side rail 11 and the second side rail 12 of the truck frame 10 may effectively resist the torsional load. That is, the truck frame 10 according to exemplary embodiments of the present disclosure may improve the stiffness of the vehicle body by the rear reinforcing structure 40, and provide the rear-side component mounting space 60, in which the additional battery 8 or other heavy components are mounted, between the first side rail 11 and the second side rail 12.

As set forth above, the truck frame according to exemplary embodiments of the present disclosure may secure a space for mounting the battery or various components between the pair of side rails, and improve the stiffness of the vehicle body, thereby being commonly applicable to a variety of trucks such as diesel engine trucks and electric trucks.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A truck frame, comprising:
    a first side rail including a first web, a first top flange formed on a top end of the first web, and a first bottom flange formed on a bottom end of the first web;
    a second side rail spaced apart from the first side rail to face the first side rail, and including a second web, a second top flange formed on a top end of the second web, and a second bottom flange formed on a bottom end of the second web;
    a reinforcing structure connecting the first top flange of the first side rail and the second top flange of the second side rail, and connecting the first bottom flange of the first side rail and the second bottom flange of the second side rail; and
    a component mounting space defined by the reinforcing structure between the first web of the first side rail and the second web of the second side rail,
    wherein the reinforcing structure includes:
        a first reinforcing member extending diagonally between the first top flange of the first side rail and the second top flange of the second side rail, and the first reinforcing member having an overlapping portion;
        a second reinforcing member extending diagonally between the first top flange of the first side rail and the second top flange of the second side rail, the second reinforcing member has an overlapping portion;
        wherein the first reinforcing member and the second reinforcing member are connected to cross each other;
        whereiin the overlapping portion of the first reinforcing member is recessed with respect to the overlapping portion of the second reinforcing member so that the overlapping portion of the second reinforcing member is inserted into the overlapping portion of the first reinforcing member; and
        wherein the overlapping portion of the first reinforcing member and the overlapping portion of the second reinforcing member overlap and are coupled to each other.

2. The truck frame according to claim 1, wherein the reinforcing structure further includes:
    a third reinforcing member extending diagonally between the first bottom flange of the first side rail and the second bottom flange of the second side rail; and
    a fourth reinforcing member extending diagonally between the first bottom flange of the first side rail and the second bottom flange of the second side rail.

3. The truck frame according to claim 2, wherein the third reinforcing member and the fourth reinforcing member are connected to cross each other.

4. The truck frame according to claim 2, wherein the first reinforcing member has a first pair of coupling flanges individually coupled to the first top flange of the first side rail and the second top flange of the second side rail, and the second reinforcing member has a second pair of coupling flanges individually coupled to the first top flange of the first side rail and the second top flange of the second side rail.

5. The truck frame according to claim 2, wherein the third reinforcing member has a third pair of coupling flanges individually coupled to the first bottom flange of the first side rail and the second bottom flange of the second side rail, and an overlapping portion located between the third pair of coupling flanges, and
the fourth reinforcing member has a fourth pair of coupling flanges individually coupled to the first bottom flange of the first side rail and the second bottom flange of the second side rail, and an overlapping portion located between the fourth pair of coupling flanges.

6. The truck frame according to claim 5, wherein the overlapping portion of the third reinforcing member and the overlapping portion of the fourth reinforcing member overlap and are coupled to each other.

7. The truck frame according to claim 2, wherein the component mounting space is defined by the first reinforcing member, the second reinforcing member, the third reinforcing member, the fourth reinforcing member, the first web of the first side rail, and the second web of the second side rail.

8. The truck frame according to claim 1, wherein a battery is mounted in the component mounting space.

9. A truck frame, comprising:
a first side rail including a first web, a first top flange formed on a top end of the first web, and a first bottom flange formed on a bottom end of the first web;
a second side rail spaced apart from the first side rail to face the first side rail, and including a second web, a second top flange formed on a top end of the second web, and a second bottom flange formed on a bottom end of the second web;
a front reinforcing structure adjacent to front wheels of a truck, connecting the first top flange of the first side rail and the second top flange of the second side rail, and connecting the first bottom flange of the first side rail and the second bottom flange of the second side rail;
a rear reinforcing structure adjacent to rear wheels of the truck, connecting the first top flange of the first side rail and the second top flange of the second side rail, and connecting the first bottom flange of the first side rail and the second bottom flange of the second side rail;
a front-side component mounting space defined by the front reinforcing structure between the first web of the first side rail and the second web of the second side rail; and
a rear-side component mounting space defined by the rear reinforcing structure between the first web of the first side rail and the second web of the second side rail;
wherein the front reinforcing structure includes:
a first front reinforcing member extending diagonally between the first top flange of the first side rail and the second top flange of the second side rail, and the first front reinforcing member having an overlapping portion;
a second front reinforcing member extending diagonally between the first top flange of the first side rail and the second top flange of the second side rail, the second front reinforcing member has an overlapping portion;
wherein the first front reinforcing member and the second front reinforcing member are connected to cross each other,
wherein the overlapping portion of the first front reinforcing member is recessed with respect to the overlapping portion of the second front reinforcing member so that the overlapping portion of the second front reinforcing member is inserted into the overlapping portion of the first front reinforcing member, and
wherein the overlapping portion of the first front reinforcing member and the overlapping portion of the second front reinforcing member overlap and are coupled to each other.

10. The truck frame according to claim 9, wherein at least two components are mounted on the first side rail and the second side rail to be disposed on lateral sides of the front reinforcing structure.

11. The truck frame according to claim 9, wherein at least two components are mounted on the first side rail and the second side rail to be disposed on lateral sides of the rear reinforcing structure.

\* \* \* \* \*